United States Patent [19]

Parriaux et al.

[11] Patent Number: 5,280,550
[45] Date of Patent: Jan. 18, 1994

[54] METHOD OF COUPLING AN OPTICAL FIBER TO AN OPTOELECTRONIC COMPONENT AND CONNECTOR DEVICES OBTAINED THEREBY

[75] Inventors: Olivier Parriaux, Lausanne; Patrick Debergh, Cressier, both of Switzerland

[73] Assignee: Centre Suisse D'Electronique et de Microtechnique S.A., Switzerland

[21] Appl. No.: 903,941

[22] Filed: Jun. 26, 1992

[30] Foreign Application Priority Data

Jun. 26, 1991 [CH] Switzerland ............... 01882/91

[51] Int. Cl.$^5$ .............................................. G02B 6/36
[52] U.S. Cl. ..................................... 385/50; 385/14
[58] Field of Search ................... 385/14, 46, 50, 88, 385/89, 90, 91, 92, 93, 94

[56] References Cited

U.S. PATENT DOCUMENTS

| | | | |
|---|---|---|---|
| 4,273,445 | 6/1981 | Thompson et al. | 385/14 |
| 4,474,425 | 10/1984 | Kaede | 385/46 |
| 4,756,591 | 7/1988 | Fischer et al. | 385/88 |
| 4,765,702 | 8/1988 | Dohan et al. | 385/14 |
| 4,767,174 | 8/1988 | Carenco et al. | 385/97 |
| 4,768,848 | 9/1988 | Vaerewyck | 385/14 |
| 4,796,975 | 1/1989 | Lukas et al. | 385/50 |
| 4,878,728 | 11/1989 | Mannschke | 385/14 |

FOREIGN PATENT DOCUMENTS

0126003 11/1984 European Pat. Off. .
0146196 6/1985 European Pat. Off. .
0277390 8/1988 European Pat. Off. .

OTHER PUBLICATIONS

Nissim et al., OPTO, 21-23 May 1985, Paris (France), "Réalisation de Composants Passifs Optiques Intégré en Verre Optique Moulable,", pp. 114-116.
Patent Abstracts of Japan, vol. 9, No. 56 (E-302) [1779], Mar. 12, 1985, & JP,A,59197184 (Nippon Denki) Nov. 8, 1984, voir abrégé.
Patent Abstracts of Japan, vol. 12, No. 334 (P-756) [3181], Sep. 8, 1988, & JP,A,63096609 (NEC Corp.) Apr. 27, 1988, voir abrégé.

Primary Examiner—Frank Gonzalez
Attorney, Agent, or Firm—Parkhurst, Wendel & Rossi

[57] ABSTRACT

A method of coupling an optical fiber to an optoelectronic component including a substrate having an optical waveguide therein, the waveguide opening into a notch formed in or on a first face of the substrate, including the steps of pre-positioning the optical fiber in a groove of an optical fiber support, the groove terminating at a first face of the optical fiber support, positioning the fiber support such that the first face of the substrate and the first face of the fiber support are directly opposite each other, the first faces forming a gap therebetween, and positioning an end of the optical fiber to be in the notch such that the waveguide and the optical fiber are optically aligned.

8 Claims, 3 Drawing Sheets

METHOD OF COUPLING AN OPTICAL FIBER TO AN OPTOELECTRONIC COMPONENT AND CONNECTOR DEVICES OBTAINED THEREBY

BACKGROUND OF THE INVENTION

1. Field of the Invention

The present invention generally relates to device involved in optical connections, and more particularly to a method of coupling an optical fiber to an optoelectronic component, and to connector devices obtained thereby.

2. Description of the Prior Art

U.S. Pat. No. 4,756,591 to K. Fischer et al. describes a device for coupling an optical fiber to an optoelectronic component having an optical waveguide. The alignment between optical fiber and optoelectronic component is effected by means of a fiber support. The fiber support is made of silicon and comprises a V-shaped groove.

The alignment of the core of the optical fiber with the waveguide requires a groove of significant depth, of the order of 100 $\mu$m, and thus requiring an orientation of the axes of the single crystal of silicon to within 0.1° in order to obtain a depth reproducible with an accuracy on the order of tenths of a micron.

Accuracy of the alignment is dependent on the positioning of the optical fiber upon mounting thereof in the V-shaped groove. Proper positioning requires use of a groove of significant length. Moreover, positioning of the support relative to the optoelectronic component requires high precision in flatness of the contacting front surfaces of the support and optoelectronic component.

The known etching methods for making the V-shaped grooves provide an accuracy on the order of some tenths of a micron.

The document "Realisation de composants passifs optiques integres en verre moulable" [Implementing passive optical components in moldable glass], by C. Nissim et al., Opto 85, pp 114–115, shows a device enabling the positioning of the optical fibers facing integrated optical waveguides.

The solution which is described consists of forming V-shaped notches by precision molding in a glass plate. The waveguides are then formed in the moldable glass referenced to the position assumed by the fiber in its notch.

The difficulty with such a solution lies in its requisite method of alignment. The position to be considered is determined by the optical fiber in its notch so that the alignment can only be effected by placing the guide at the right depth at the time of a second ion exchange, which is not easy to control.

Another difficulty is that the position assumed by each of the fibers varies, depending on the particular fiber. These positions necessitate notches of great depth, obtained by molding, which have insufficient accuracy to allow proper alignment of monomode optical fibers. The solution proposed can thus only be applied to multimode optical fibers.

SUMMARY OF THE INVENTION

Thus, an object of the present invention is a method allowing the alignment of an optical fiber and an optical waveguide integrated into a substrate which overcomes the difficulties referred to above.

Another object is a method of coupling an optical fiber to an optoelectronic component comprising an integrated optical waveguide, suitable for use in optically guided monomode.

Another object is an advantageous method of coupling an optical fiber to an optoelectronic component comprising at least one integrated optical waveguide.

Another object is a connector device for connecting optical fibers to an optoelectronic component comprising at least one integrated optical waveguide.

Another object is a connector device for optical fibers.

The present invention includes a method of coupling an optical fiber to an optoelectronic component including a substrate having an optical waveguide therein, the waveguide opening into a notch formed in or on a first face of the substrate, including the steps of pre-positioning the optical fiber in a groove of an optical fiber support, the groove terminating at a first face of the optical fiber support and the optical fiber protruding from said support, positioning the fiber support such that the first face of the substrate and the first face of the fiber support are directly opposite each other, the first faces forming a gap therebetween, and positioning an end of the optical fiber to be in the notch such that the waveguide and the optical fiber are optically aligned.

The present invention also includes a connector device for an optical fiber, including an optoelectronic component including a substrate having a first face, the first face having a notch formed therein or thereon, and an optical waveguide opening into the notch, and an optical fiber support having at least one groove for receiving and pre-positioning the optical fiber in such a manner that it protrudes from said optical fiber support said at least one groove terminating at a first face of the optical fiber support, retaining means for retaining the optical fiber in the at least one groove and support means for positioning the optical fiber support relative to the optoelectronic component such that the first face of the substrate and the first face of the optical fiber support are opposite each other and form a gap therebetween. Preferably, the notch is V-shaped.

The present invention also includes a connector device for optical fibers, including an optoelectronic component including a substrate having first and second faces, and first and second notches formed in or on the first and second faces, respectively, and an optical waveguide having a first end opening into the first notch and a second end opening into the second notch, a first optical fiber support having a first groove for receiving and pre-positioning a first optical fiber in such a manner that it protrudes from said first optical fiber support the first groove terminating at a first face of the first optical fiber support, and a second optical fiber support having a second groove for receiving and pre-positioning a second optical fiber in such a manner that it protrudes from said second optical fiber support, the second groove terminating at a first face of the second optical fiber support, retaining means for retaining the first and second optical fibers in the first and second grooves, respectively and support means for positioning the first and second optical fiber supports relative to the optoelectronic component such that the first face of the optoelectronic component and the first face of the first optical fiber support are opposite each other and form a gap therebetween and the second face of the optoelectronic component and the first face of the second optical fiber support are opposite each other and form a gap therebetween. Preferably, the notches are V-shaped or truncated-V-shaped.

An advantage of the coupling method and of the connector devices of the invention is that the alignment of the core of the optical fiber with the waveguide is not dependent in a critical manner on the position of the fiber in the groove of its support, nor on the positioning of the fiber support relative to the optoelectronic component.

A first consequence is the positioning of the support relative to the optoelectronic component being effected with a precision less than the precision required in prior art devices.

A second consequence is that the V-shaped grooves of the fiber support can be formed with a precision of the order of microns.

These two advantages follow from the fact that the fiber support and its grooves are not largely responsible for the alignment precision between the fiber and the waveguide.

Another advantage of the invention is that, although the notch is formed by conventional planar etching techniques or even by a growth technique of a metallic layer, it is formed with extreme precision. This is due to the fact that the photolithographic definition of the notch and the forming of this notch in or on the substrate are effected in a frontal manner. In other words, the planar etching or the growth of a metallic layer is effected in the direction of propagation of the optical wave, which is parallel to two sides forming the "V" of the notch.

Another advantage of the method of manufacture of the structure of the invention is that the etching depth or the thickness of the metallic growth is limited to the length of the notch, which can be less that its depth. The etching time is thus reduced, resulting in easier control and better precision.

BRIEF DESCRIPTION OF THE DRAWINGS

Other objects, features and advantages of the present invention will appear more clearly from reading the following description, given purely by way of illustration and with reference to the accompanying drawings, in which.

DETAILED DESCRIPTION OF THE PREFERRED EMBODIMENTS

Figure 1:
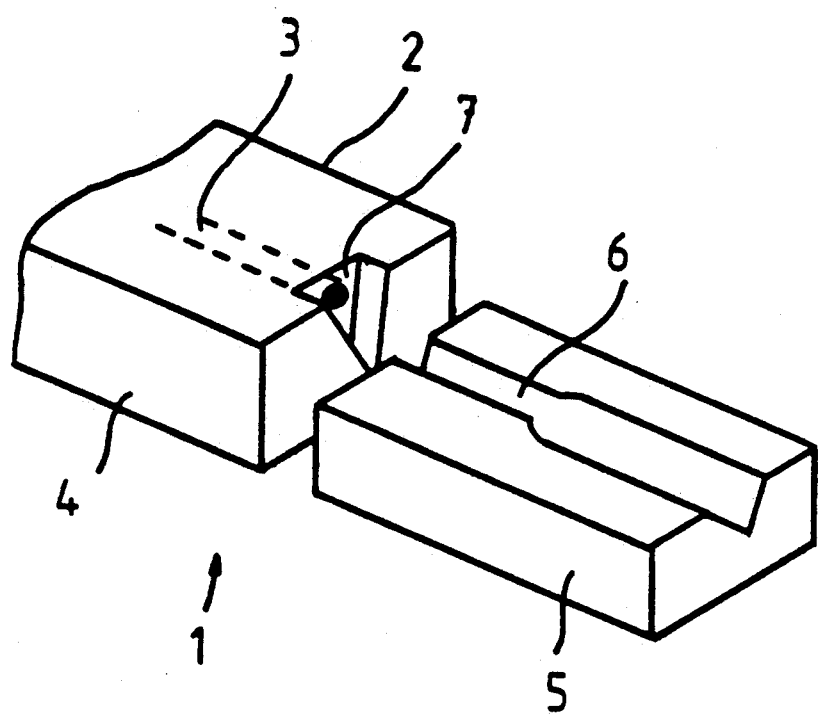
FIGS. 1, 2 and 3 show two connector devices in conformity with the invention.

A preferred embodiment of the connector device according to the invention is shown in FIG. 1.

The connector device 1 comprises a fiber support 5 positioned adjacent to optoelectronic component 2. The optoelectronic component is held at the end of the fiber support by support means, such as base-plate 18, shown in FIG. 2. According to this preferred embodiment, the faces of fiber support 5 and of optoelectronic component which face each other are not in direct contact. In other words, the positioning of the fiber support along the extension of the optoelectronic component does not require highly accurate flatness of the front face of the fiber support, since these faces do not contact each other.

Figure 3:
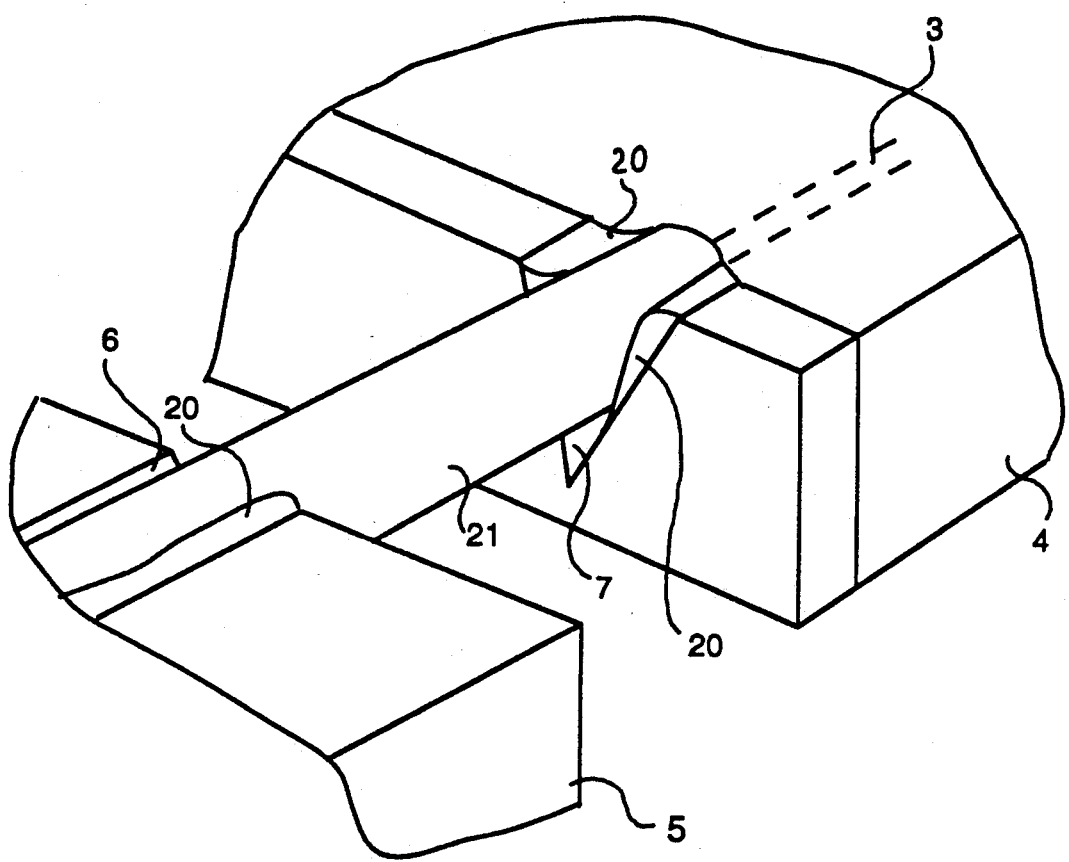

The fiber support has a groove 6 in the form of a "V", in which the optical fiber, having possibly been partially stripped, is pre-positioned in such a manner that it protrudes from the fiber support. The size of the groove is matched to the dimensions of the stripped fiber and/or of the external sheath of the fiber. The optical fiber is retained in the groove by retaining means, such as glue 20, shown in FIG. 3.

The optoelectronic component is formed by a substrate 4 in which there is integrated at least one optical waveguide 3 to be coupled to an optical fiber 21. The substrate comprises a notch 7 in the shape of a "V" or a truncated "V", into which the waveguide of the optoelectronic component opens. The optical fiber is held in groove 6 of fiber support 5 and protrudes from the latter. Fiber support 5 is positioned in the extension of optoelectronic component 2 in such a manner that the end of the optical fiber lodges in the V-shaped notch. The sides of the V-shaped notch define a predetermined position for the end of the optical fiber such that it will be aligned with the waveguide, in order to permit optimum transmission of the light energy. Then the optical fiber is secured in the notch by means of glue (retaining means 20).

In such an arrangement, proper positioning the fiber support relative to the optoelectronic component may be effected using elements of lower precision with respect to those of the prior art. Moreover, the V-shaped groove is formed with standard precision since it is only intended to pre-position the optical fiber.

A method of coupling an optical fiber to an optoelectronic component 2 having an optical waveguide 3 integrated in a substrate is as follows:

The optical fiber is pre-positioned in a groove 6 formed in a fiber support 5. The fiber is pre-positioned in the groove in such a manner that it protrudes from the fiber support 5 and retained therein by retaining means. The end of the optical fiber is positioned in a predetermined manner in a notch 7 formed at an edge of substrate 4 into which the waveguide of the optoelectronic component opens, in such a manner that the end of the optical fiber will be aligned with the waveguide to allow maximum transmission of the light energy. The fiber support is positioned adjacent the edge of substrate 4 having notch 7 by support means, such as base-plate 18. The front faces of the optoelectronic component and of the fiber support facing each other are not direct contact, such that the alignment of the core of the optical fiber with the waveguide will not be dependent on the relative position of the fiber in the groove of its support, nor on the positioning of the fiber support relative to the optoelectronic component.

The V-shaped grooves of the fiber support are obtained using known methods, for example by molding thereof in a support of metal or ceramic, or even by molding thereof in a plastic or a glass.

A first method of making the notch in substrate 4 (for example made of glass, $LiNbO_3$, etc.) comprises the following main steps:

polishing the edge of the substrate located at the end of the waveguide;

depositing a film of photosensitive resin on the edge;

transferring a V-shaped pattern photolithographically to the edge, the pattern being formed by a mask and centered on the waveguide; and dry-etching frontally to a small depth, around 20 to 30 $\mu m$.

In conformity with the invention, the polished surface on which the chemical etching mask is formed is the frontal surface of the substrate in such a manner that the notch thus formed at the edge of the substrate ensures alignment of the end of the optical fiber lodged in the notch with the waveguide of the optoelectronic component, which waveguide opens into the notch.

The chemical etching for forming the notch is effected to a small depth, typically 20 to 30 μm.

Another method of manufacture of the notch (cf. I. Milosevic et al. "Polyamide Enable High Lead Count TAB", Semiconductor International, October 1988, Cahners Publishing Company) comprises the following main steps:

deposition of a film of negative photosensitive resin on a surface of the substrate, to a thickness of about 20 μm;

exposure of the photosensitive resin film by projection through a mask in the shape of a "V", with the aid of a stepper;

development of the resin;

dissolving the resin outside the position of the notch;

evaporation of a metallic film on the face;

electro-deposition of a metallic layer on the metal film; and dissolving the remaining resin.

In conformity with the invention, these steps are carried out on a frontal face of the substrate of the optoelectronic component facing the optical fiber support.

The growth is effected on the frontal face in such a manner that the notch thus formed at the edge of the substrate ensures alignment of the end of the optical fiber lodged in the notch with the waveguide of the optoelectronic component, which waveguide opens into the notch. The growth of the metallic layer to form the notch is effected to a small thickness, typically 10 to 20 μm.

Although the present invention has been described in relation to a particular embodiment, it is clear that it is susceptible to modifications and/or variants without leaving the scope thereof.

One variant of the connector device in accordance with the invention allows several optical fibers to be coupled to an optoelectronic component.

In this variant, the fiber support comprises several V-shaped grooves, in which of the optical fibers are pre-positioned. The optoelectronic component is formed by a substrate in which there are integrated several optical waveguides to be coupled to the optical fibers. The substrate then comprises in the extensions of the grooves several notches, into which the waveguides of the optoelectronic component open.

Figure 2:
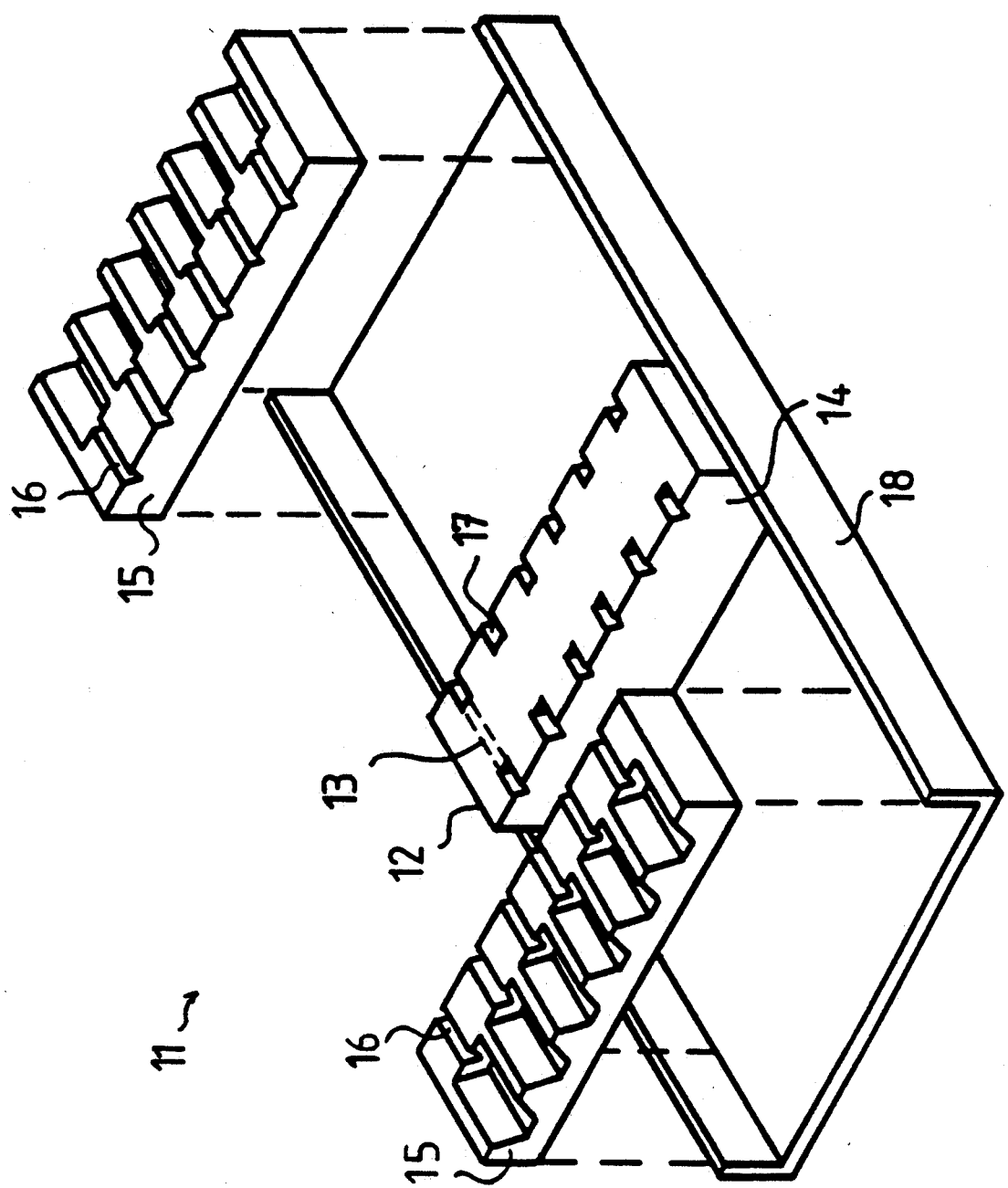

In conformity with the invention and as is shown in FIG. 2, a connector device 11 for optical fibers, comprises:

an optoelectronic component 12 having at least one waveguide 13 which is integrated into a substrate 14 and each end of which opens in a notch 17 formed on either side of the component;

two optical fiber supports 15 provided with grooves 16 in which the optical fibers are pre-positioned, located on the two sides of the optoelectronic component;

retaining means for holding the pre-positioned optical fibers in the grooves; and support means, such as base plate 18 for holding the fiber supports at the end of the optoelectronic component, in such a manner that the end of the optical fiber lodges in the notch so that the fiber will be aligned with the waveguide, to allow maximum transmission of the light energy.

In such devices, the alignment of the core of the fiber with the waveguide is not dependent on the relative position of the fiber in the groove and its support, nor on the positioning of the fiber support relative to the optoelectronic component.

In conclusion, the optical fibers are pre-positioned on the fiber supports by the retaining means, for example by bonding the fibers in their respective grooves. The fiber supports are positioned to face the optoelectronic component by support means, for example a base plate. Finally, the ends of the optical fibers previously lodged in their respective notches are held therein by suitable means, for example with a cover plate, which can be snap fitted to the base plate.

What is claimed is:

1. A method of coupling an optical fiber to an optoelectronic component comprising a substrate having an optical waveguide therein, said waveguide opening into a notch formed in or on a first face of said substrate, comprising the steps of:

pre-positioning said optical fiber in a groove of an optical fiber support, said groove terminating at a first face of said optical fiber support;

positioning said fiber support such that said first face of said substrate and said first face of said fiber support are directly opposite each other, said first faces forming a gap therebetween; and positioning an end of said optical fiber in said notch such that said waveguide and said optical fiber are optically aligned.

2. A connector device for an optical fiber, comprising:

an optoelectronic component comprising a substrate having a first face, said first face having a notch formed therein or thereon, and an optical waveguide opening into said notch; and an optical fiber support having at least one groove for receiving and pre-positioning said optical fiber, said at least one groove terminating at a first face of said optical fiber support;

retaining means for retaining said optical fiber in said at least one groove; and support means for positioning said optical fiber support relative to said optoelectronic component such that said first face of said substrate and said first face of said optical fiber support are opposite each other and form a gap therebetween.

3. The device of claim 2, wherein said notch is V-shaped.

4. The device of claim 2, wherein said notch is truncated-V-shaped.

5. A connector device for optical fibers, comprising:

an optoelectronic component comprising a substrate having first and second faces, and first and second notches formed in or on said first and second faces, respectively, and an optical waveguide having a first end opening into said first notch and a second end opening into said second notch;

a first optical fiber support having a first groove for receiving and pre-positioning a first optical fiber, said first groove terminating at a first face of said first optical fiber support; and a second optical fiber support having a second groove for receiving and pre-positioning a second optical fiber, said second groove terminating at a first face of said second optical fiber support;

retaining means for retaining said first and second optical fibers in said first and second grooves, respectively; and support means for positioning said first and second optical fiber supports relative to said optoelectronic component such that said first face of said optoelectronic component and said first face of said first optical fiber support are opposite each other and form a gap therebetween and said second face of said optoelectronic component and said first face of said second optical fiber support are opposite each other and form a gap therebetween.

6. The device of claim 4, wherein said first and second notches are V-shaped.

7. The device of claim 4, wherein said first and second notches are truncated-V-shaped.

8. A method of coupling an optical fiber to an optoelectronic component comprising a substrate having an optical waveguide therein, comprising the steps of:

forming a notch in or on a first face of said substrate such that said optical waveguide opens into said notch;

pre-positioning said optical fiber in a groove of an optical fiber support, said groove terminating at a first face of said optical fiber support;

positioning said fiber support such that said first face of said substrate and said first face of said fiber support are directly opposite each other, said first faces forming a gap therebetween; and positioning an end of said optical fiber in said notch such that said waveguide and said optical fiber are optically aligned.

* * * * *